United States Patent [19]

Morita

[11] Patent Number: 5,578,914
[45] Date of Patent: Nov. 26, 1996

[54] CHARGING SYSTEM FOR MULTI-CELL BATTERY

[75] Inventor: Koji Morita, Yokosuka, Japan

[73] Assignee: Nissan Motor Co., Ltd., Kanagawa, Japan

[21] Appl. No.: 453,428

[22] Filed: May 30, 1995

[30] Foreign Application Priority Data

Jun. 8, 1994 [JP] Japan .................................. 6-150517

[51] Int. Cl.$^6$ ................................................ H01M 10/46
[52] U.S. Cl. ................................................ 320/18; 320/22
[58] Field of Search .................................. 320/6, 16, 17, 320/18, 15, 22, 23, 24

[56] References Cited

U.S. PATENT DOCUMENTS 4,238,721   12/1980   DeLuca et al. ............................ 320/18
4,614,905   9/1986   Petersson et al. ......................... 320/18

FOREIGN PATENT DOCUMENTS 61-206179   9/1986   Japan .

Primary Examiner—Peter S. Wong
Assistant Examiner—Patrick B. Law
Attorney, Agent, or Firm—Lowe, Price, LeBlanc & Becker

[57] ABSTRACT

A battery charging system is arranged to reduce a bypass capacity and to enable a charging operation with high current. A plurality of single battery cells 1 connected in series is connected to a charger 6, and each cell is connected in parallel with a constant voltage circuit 4 having a constant voltage control section 2 and a current saturation detecting section 3. The constant voltage control section 2 detects the terminal voltage, compares the detected terminal voltage with a preset voltage, and control the terminal voltage so as to be held constant by causing the charging current to bypass in accordance with the error resulting from the comparison. The current saturation detecting section 3 sends a command signal through an OR circuit to the charger 6 when the bypass current becomes saturated, and the charger 6 reduces the charging current in response to the command signal. Therefore, the capacity of the bypass current can be set at a lower level, and the high current charging is possible.

19 Claims, 5 Drawing Sheets

CHARGING SYSTEM FOR MULTI-CELL BATTERY

BACKGROUND OF THE INVENTION

The present invention relates to a charging system for charging a set of constituent batteries, and more particularly to a charging system for a battery assembly consisting of a plurality of single battery cells connected in series.

One conventional example of the battery charging circuit is shown in Japanese Patent Provisional (Unexamined) Publication 61-206179. To equalize the charging conditions of the individual cells, a zener diode is connected in parallel to each cell in a reverse bias current direction. This charging system is arranged to bypass the charging current and thereby to adjust the progress of charging by utilizing a break down of the zener diode in accordance with an increase of the terminal voltage of each cell.

In this conventional example, however, the zener voltage must be chosen preliminarily to suit a charge termination voltage of each cell, and, in order to prevent overcharge, the charging current must be bypassed completely without flowing through the cell. Therefore, the bypass circuit of the zener diode must have a large capacity especially for boost charge (quick charge) or for a large capacity battery. As a result, the conventional charging system requires additional measures for dissipation of heat due to the bypass current, and incurs cost increase. Furthermore, the arrangement of a zener diode of a large capacity for each cell increases the size of the charging system.

SUMMARY OF THE INVENTION

It is therefore an object of the present invention to provide a battery charging system capable of high current charging with a bypass circuit of a reduced current capacity.

According to the present invention, a charging system for a battery of single cells of series connection, comprises: a charging means which is arranged to charge the battery and which is capable of controlling a charging current; a voltage detecting means for detecting a terminal voltage of each of said single cells; a constant voltage means for controlling the terminal voltage of each single cell by bypassing the charging current of each single cell; a current saturation detecting means for detecting a saturation of a bypass current caused by said constant voltage means; and a controlling means for controlling said charging means so as to decrease the charging current in accordance with an output of said current saturation detecting means.

The constant voltage means connected with each cell can control the terminal voltage at a constant voltage by bypassing a part of the charging current. The current saturation detecting means monitors operation of the constant voltage means, and produces a saturation signal when the bypass current is saturated. In response to this saturation signal, the controlling means can control the charging means to decrease the charging current, and by so doing, cancel the saturation of the constant voltage means. Even when the capacity of the bypass current is set at a level lower than the charging current, therefore, the constant voltage means is always in a controllable state capable of controlling the terminal voltage. Thus, the constant voltage means can be made up of a device having a low current capacity.

In the charging system according to the present invention, there may be provided a further means, such as a logic circuit, for producing a saturation signal in response to at least one output signal of said current saturation detecting means, and the controlling means may be arranged to decrease the charging current in response to said saturation signal.

The logic circuit, for example, performs a logic operation on the output signal of each current saturation detecting means, and delivers the saturation signal to the controlling means when at least one of the constant voltage circuits is saturated. Therefore, the charging system according to the present invention can control the terminal voltages of the single cells uniformly, prevent overcharge of each cell, and increase the cycle life of the battery.

The logic circuit may comprise an OR circuit, or may comprise two or more OR circuits and an AND circuit. In the latter case, the cells are divided into a plurality of blocks so that each block corresponds to a unique one of the OR circuits, and the outputs of all the OR circuits are connected to the inputs of the AND circuit. The thus-constructed charging system can prevent the charging current for the whole of the battery from being reduced by an increase of the terminal voltage of one cell which has lost the balance.

Each constant voltage means may be connected with the corresponding cell so that power is supplied from that cell. In this case, it is possible to integrate the constant voltage means and the corresponding cell into a single unit.

The charging means may be arranged to perform a constant current charging operation and to reduce the charging current stepwise. In this case, it is possible to reduce the charging time until a fully charged state.

The amount by which the charging current is decreased at each step may be equal to or greater than the bypass current capacity of the constant voltage means, and equal to or smaller than the product obtained by multiplying the bypass current capacity by two. In this case, the constant voltage means does not need to be always active. Therefore, the thus-constructed system can restrain the heat generation due to the bypass current and prevent the charging time from being prolonged.

DETAILED DESCRIPTION OF THE INVENTION

Figure 1:
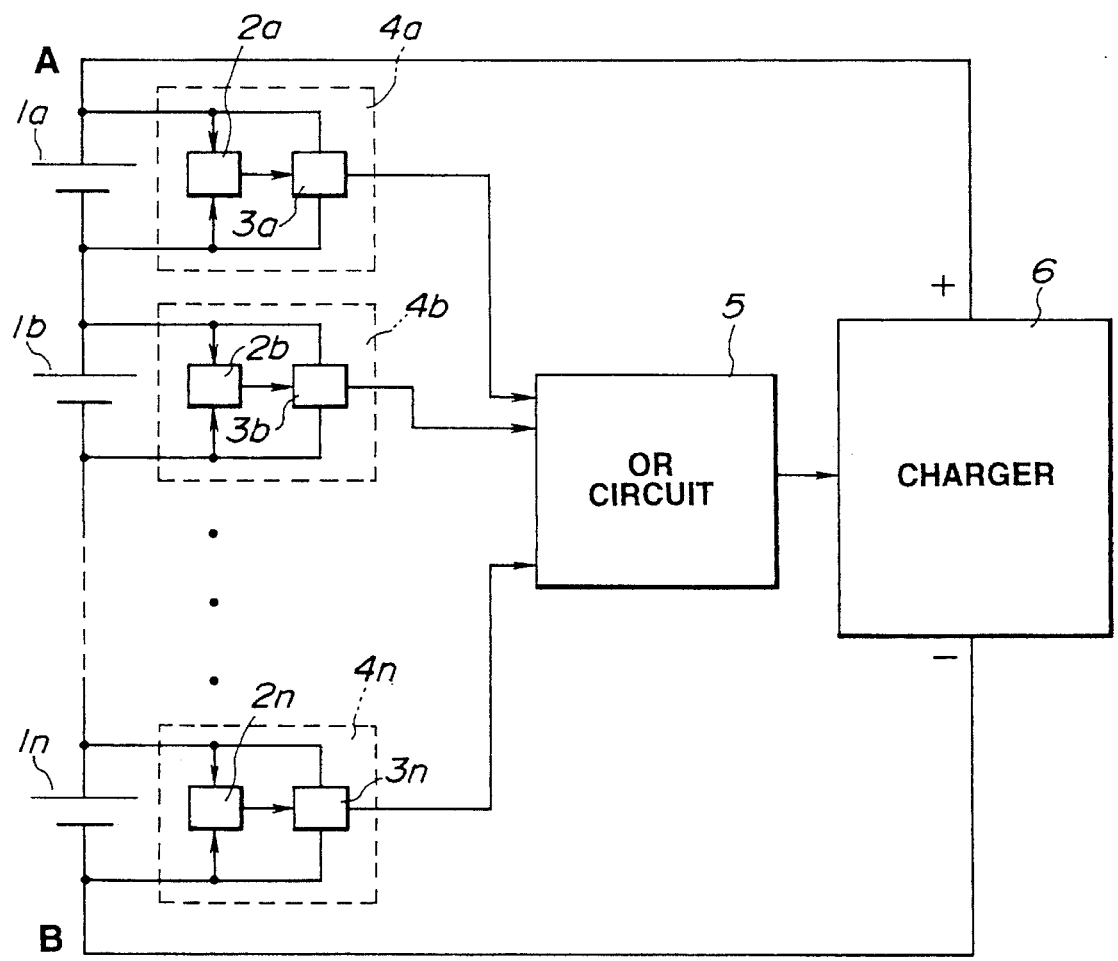
FIG. 1 is a block diagram showing a battery charging system according to a first embodiment of the present invention.

FIG. 1 shows a battery charge system according to a first embodiment of the present invention. In this example, a battery assembly consists of a plurality of single cells $1a$, $1b$, ... $1n$ connected in series, and a constant voltage circuit $4a$, 4b, . . . or 4n is connected in parallel to each cell. An output of each constant voltage circuit 4a, 4b, . . . or 4n is connected through an OR circuit 5 to a charger 6. The charger 6 has first and second output terminals which are connected, respectively, to first and second terminals A and B of the battery assembly.

Each of the constant voltage circuits 4 (4a, 4b, . . . , and 4n) comprises a terminal voltage control section (or first section) 2 (2a, 2b, . . . , and 2n) and a current saturation detecting section (or second section) 3 (3a, 3b, . . . , and 3n).

Each terminal voltage control section 2 detects the voltage of the associated single cell 1, compares the detected voltage of the single cell 1 with a preset voltage which the section 2 has therein, and controls the terminal voltage so as to hold the terminal voltage constant by causing the charging current to bypass in accordance with an error resulting from the comparison.

Each current saturation detecting section 3 detects the terminal voltage of the corresponding single cell 1, detects a saturation of a bypass current flowing in the terminal voltage control section 2 from the detected terminal voltage, and delivers a command signal to decrease the charging current for the battery. This command signal of each current saturation detecting section 3 is inputted to the OR circuit 5, and a logic output of the OR circuit 5 is supplied to the charger 6.

Figure 2:
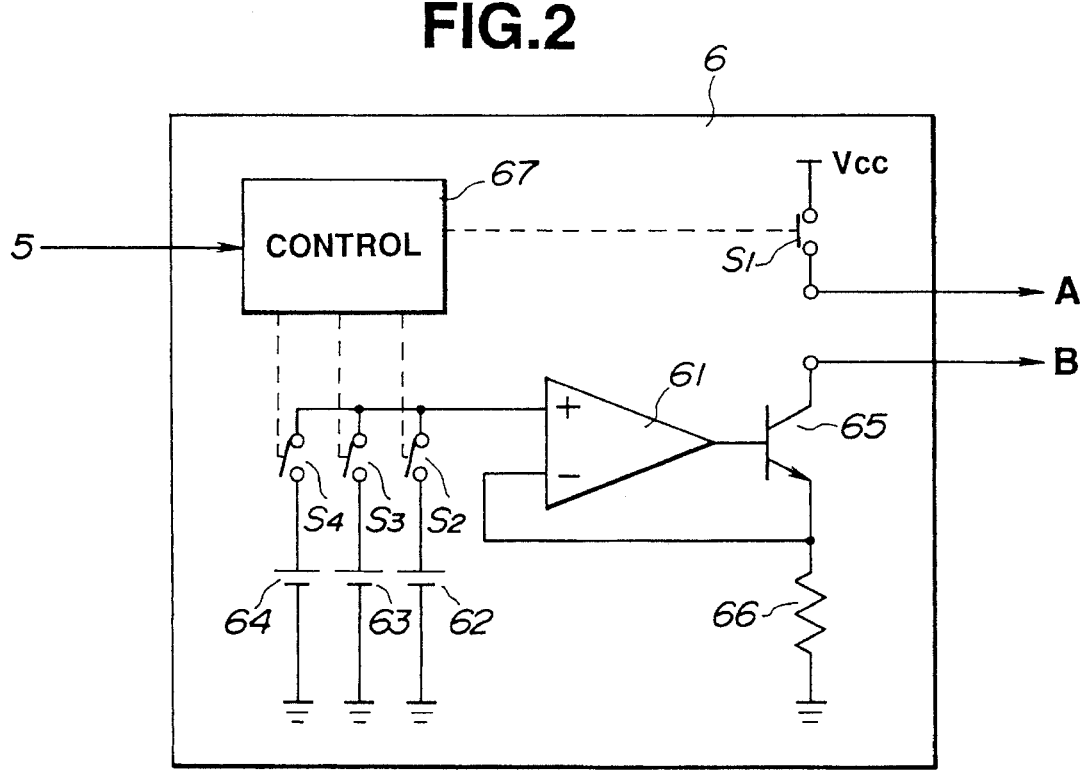
FIG. 2 is a schematic view showing an arrangement of a charger shown in FIG. 1.

As shown in FIG. 2, the charger 6 comprises a control section 67 for receiving the signal from an OR circuit 5 and controlling operations of contacts S1, S2, S3 and S4, an amplifier 61 constituting a constant voltage, constant current generator, an NPN transistor 65, a shunt resistor 66, and reference voltage generators 62, 63 and 64 for generating a constant voltage. Each of the reference voltage generators 62, 63 and 64 is connected through one of the contacts S2, S3 and S4 to a positive terminal of the amplifier 61.

The reference voltage generators 62, 63 and 64 of this example are batteries whose voltages are not equal. In this example, the difference between any two successive battery voltages is constant. This voltage difference is set equal to the lowest voltage multiplied by two. For example, the battery 64 is 2 V, the battery 63 is 6 V and the battery 62 is 10 V. The charging current is determined by a ratio between the voltage of the battery connected to the positive terminal of the amplifier 61, and the resistance of the shunt resistor 66. In this example, the charging current is required to be 25 A, and accordingly the shunt resistor 66 is 0.6 Ω when the above-mentioned voltages are employed. In this case, therefore, this system can generate 15 A and 5 A in addition to the maximum of 25 A by switching the contacts S2, S3 and S4.

To charge the battery, this system first generates the charging current of 25 A by closing the contacts S1 and S2, and supplies this charging current to the battery group through the A and B terminals. The control section 67 has a counter and a timer therein. When the command signal is inputted from the OR circuit 5, the counter is operated and counts the number of inputs of the command signal. In accordance with the thus-obtained count, the control section 67 closes a predetermined one of the contacts.

In this example, the control section 67 closes the contact S2 when the count is zero, closes the contact S3 when the count is one, and closes the contact S4 when the count is two. Thus, the charger 6 decreases the charging current stepwise from 25 A to 15 A, and then to 5 A as the number of inputs of the command signal increases. The timer is started when the contact S4 is closed. At the end of a preset time interval of the timer, the contact S1 is opened and the charging operation to the battery is finished.

Figure 3:
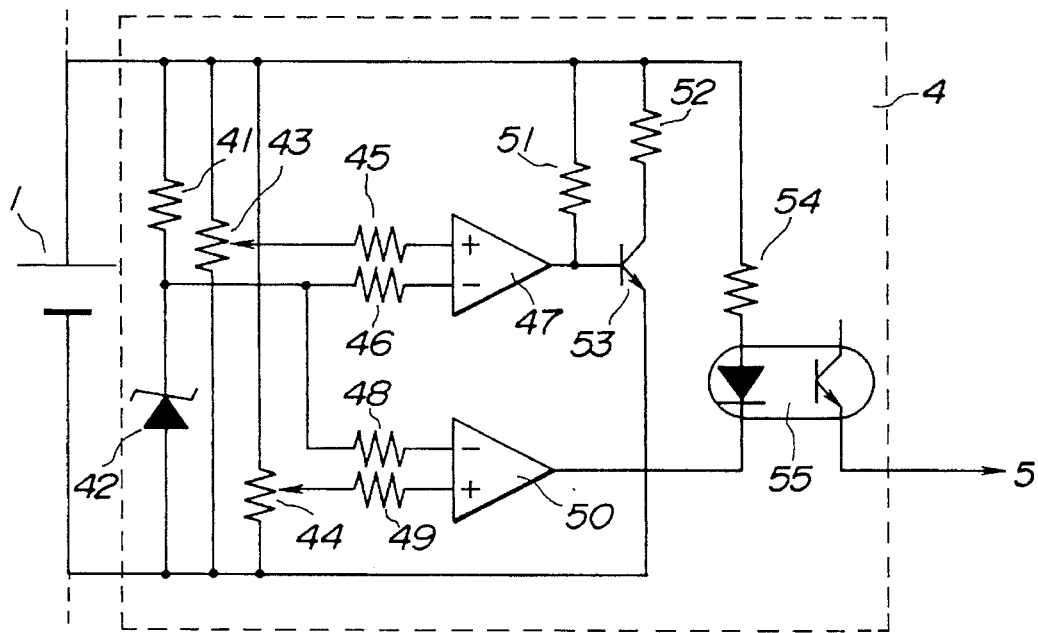
FIG. 3 is a diagram showing an arrangement of a constant voltage circuit shown in FIG. 1.

FIG. 3 shows the arrangements of the terminal voltage control section 2 and the current saturation detecting section 3 constituting each constant voltage circuit 4 of this example.

A zener diode 42 and a resistor 41 are arranged to generate a reference voltage, which is supplied through input protective resistors 46 and 48 to inverting input terminals of amplifiers 47 and 50. A variable resistor 43 is a resistor for dividing the terminal voltage of the single battery cell 1, and connected through an input protective resistor 45 to a noninverting input terminal of the amplifier 47. Thus, the variable resistor 43 constitutes a circuit for detecting a potential difference between the terminal voltage of the battery cell 1 and the preset voltage. An NPN transistor 53 has a base connected with an output terminal of the amplifier 47, and is arranged to control a collector current flowing through a resistor 52 in accordance with a voltage applied between the base and emitter of the transistor 53. The comparator 50, an input protective resistor 49 connected with the noninverting input terminal of the comparator 50, and a variable resistor 44 for dividing the terminal voltage constitutes a current saturation detecting circuit for inverting the output polarity in accordance with the terminal voltage. Its detection signal is outputted to the OR circuit 5 by a photocoupler 55 connected with the output terminal of the comparator 50. A resistor 54 is provided for limiting an operating current of the photocoupler 55.

During a battery charging operation, the terminal voltage of each single cell increases as the elapsed time increases from the beginning of the charging process. While the terminal voltage of the single cell 1 is lower than the preset value, the output voltage of the amplifier 47 is negative, and accordingly the NPN transistor 53 is in the shut-off state, so that no charging current flows through the resistor 52. When the terminal voltage of the single cell 1 reaches the preset voltage, the output of the amplifier 47 becomes positive, and the NPN transistor 53 is turned to the conductive state. As a result, part of the charging current is caused to bypass, and flows through the resistor 52. In this case, when the terminal voltage is higher, the voltage applied between the base and emitter is higher, and the current through the resistor 52 is higher. Thus, the terminal voltage of the single cell 1 is held constant.

With the further passage of time, the NPN transistor 53 gradually enters a current saturation region, and becomes unable to control the terminal voltage of the single cell 1. Accordingly, the terminal voltage of the single cell 1 begins increasing again. When the terminal voltage is increased to an inversion voltage of the comparator 50, then the comparator 50 is inverted, and the photocoupler 55 is energized, and outputs the command signal to decrease the charging current to the OR circuit 5. In response to this command signal, the charger 6 decreases the charging current. Because of this, a voltage drop due to an internal resistance of the single cell 1 becomes lower, the voltage across the terminals becomes lower than the preset voltage, the transistor 53 is restored to the shut off state, and the constant voltage circuit 4 returns to a controllable state.

Figure 4:
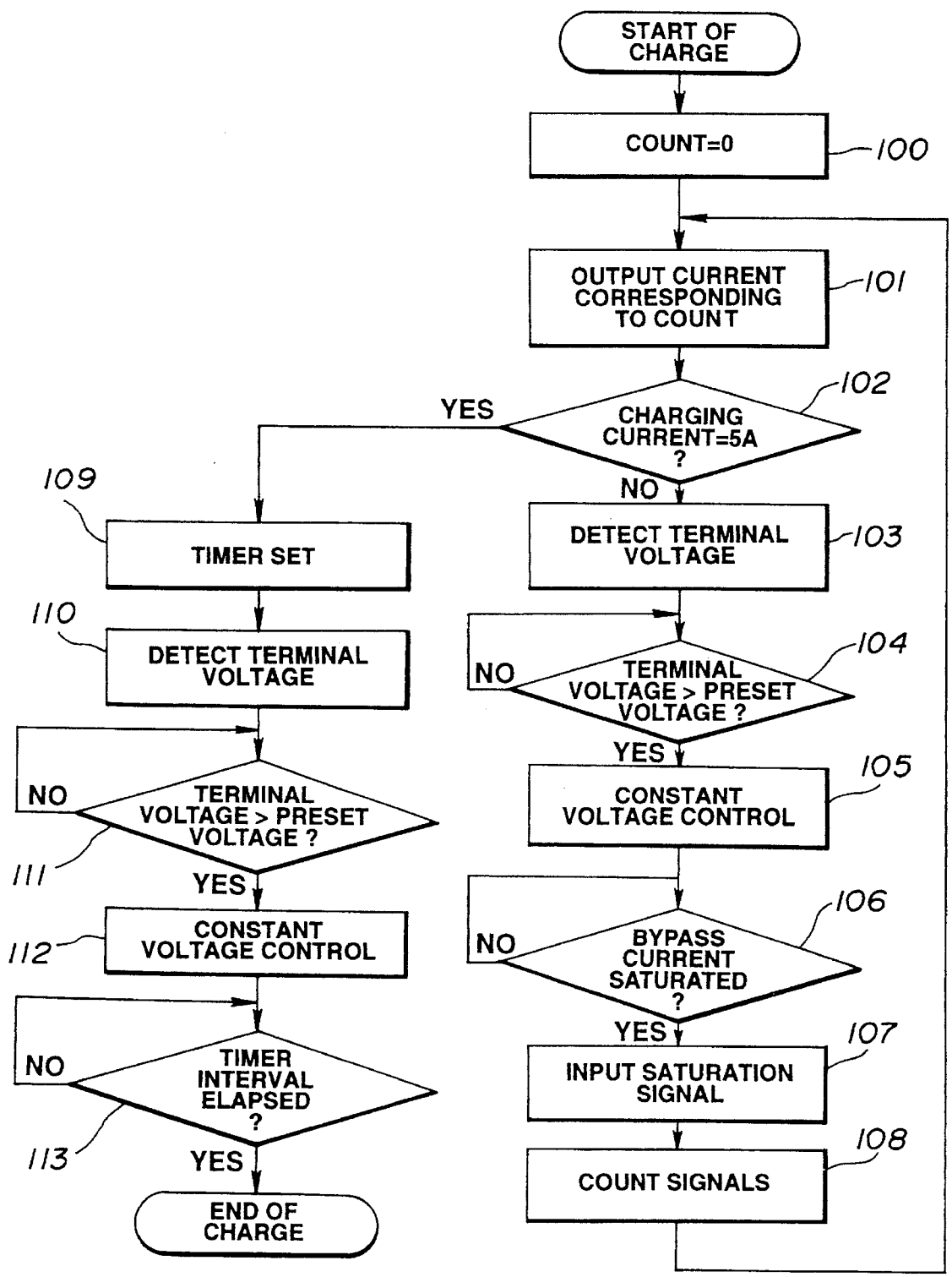
FIG. 4 is a flow chart showing control operations of the system shown in FIG. 1.
Figure 5:
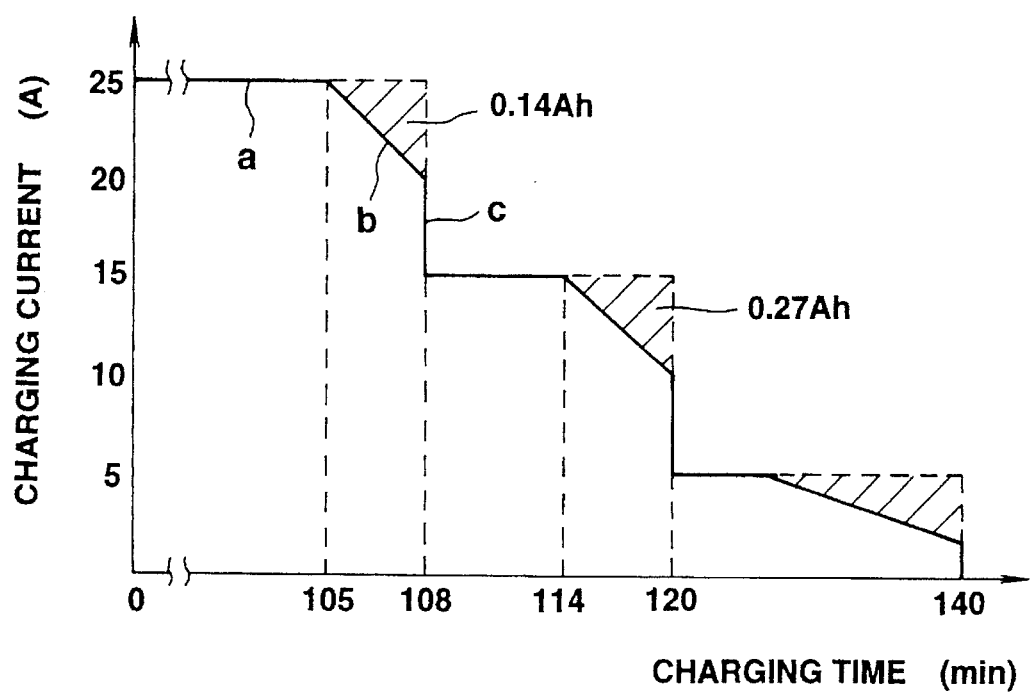
FIG. 5 is a graph showing variation of the charging current.
Figure 6:
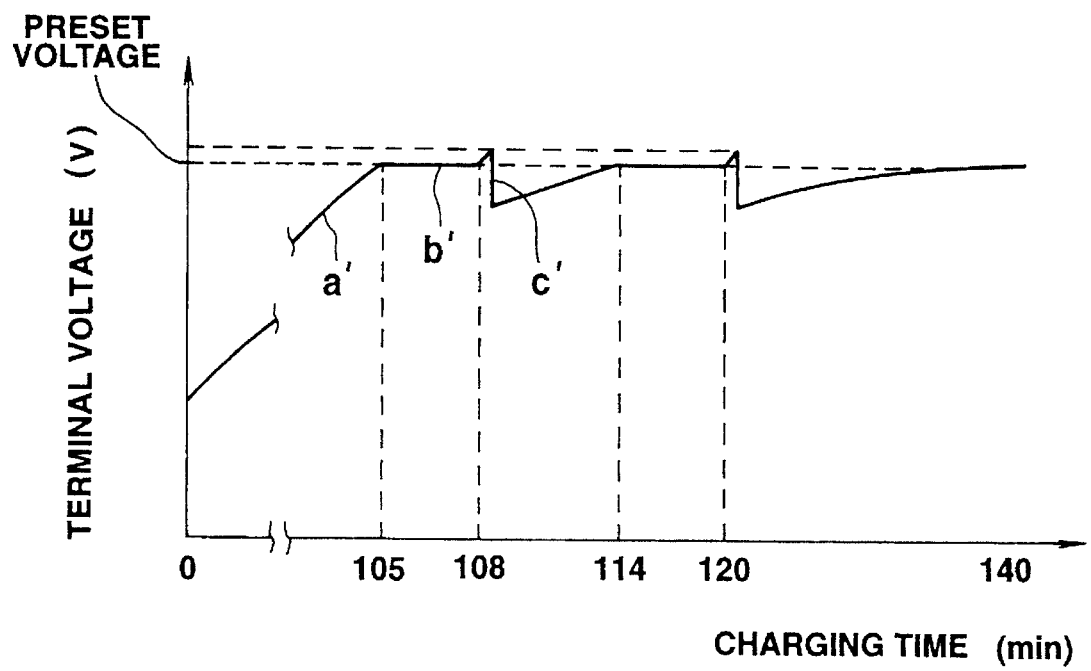
FIG. 6 is a graph showing variation of the terminal voltage of a single cell.

FIG. 4 is a flow chart showing a sequence of control operations in the above-mentioned charging system. FIG. 5 shows variation of a charging current flowing through a single cell in a battery assembly consisting of 144 single cells having a capacity of 50 Ah, and FIG. 6 shows variation of the terminal voltage of that single cell.

For charging, a timer interval is set first.

When a charging process is started, the control section 67 clears the counter to a state denoting a count of zero by producing a reset signal at a step 100. Furthermore, the contact S1 is closed so that the charger 6 is put in a state capable of supplying a charging current. At a step 101, the control section 67 closes the contact S2 in accordance with the count of the counter. Consequently, the charging current set at 25 A is delivered from the charger 6. At a step 102, it is checked whether the charging current is equal to a final level which, in this example, is 5 A. If it is not equal to 5 A, then the program of FIG. 4 proceeds to a step 103.

At the step 103, each constant voltage circuit 4 detects the terminal voltage of the corresponding single cell 1. At a step 104, the detected terminal voltage is compared with the preset voltage. The step 104 is repeated as long as the terminal voltage is lower than the set voltage. The terminal voltage increases with time as shown by a line segment a in FIG. 6, and the constant voltage circuit 4 repeatedly compares a most recent value of the increasing terminal voltage with the preset voltage. In this case, the current flowing through the single cell 1 is equal to 25 A as shown by a line segment a in FIG. 5. When the terminal voltage becomes higher than the preset voltage, then the program of FIG. 4 proceeds to a step 105. At the step 105, a bypass current is controlled in accordance with the potential difference between the detected terminal voltage and the preset voltage by the associated constant voltage circuit 4, which, by so doing, performs a constant voltage control. During this, the current through the single cell 1 is decreased as shown by a line segment b in FIG. 5 with the progress of charging because of the bypass flow of the charging current. A triangular hatched area bounded by the line segment b in FIG. 5 shows a bypassed quantity of electricity of 0.14 Ah. During this, the terminal voltage is held constant as shown by a line segment b' in FIG. 6.

At a step 106, the associated constant voltage circuit 4 determines from the terminal voltage whether the bypass current is saturated or not. The step 106 is repeated until the bypass current becomes saturated. When the bypass current reaches saturation, that constant voltage circuit 4 produces a saturation signal. This saturation signal is supplied through the OR circuit 5 to the charger 6. At a step 107, the control section 67 receives the saturation signal from the OR circuit 5. At a step 108, the control section 67 counts the number of the saturation signals inputted to the control section 67. In the first cycle, the count becomes equal to one. After the step 108, the program returns to the step 101. At the step 101 of the next cycle, the control section 67 opens the contact S2 and closes the contact S3 in response to the count of one. Thus, the charger 6 decreases the charging current from 25 A to 15 A as shown by a line segment c in FIG. 5. The terminal voltage decreases below the preset voltage as shown by a line segment c' in FIG. 6 with this decrease of the charging current. Therefore, the constant voltage circuit 4 is restored to a state capable of performing the control. Thereafter, the steps 102–108 are repeated in the same manner as mentioned above.

When the count becomes equal to two as the result of repetition of the cycle, the charging current is decreased to 5 A. Therefore, a step 109 is reached from the step 102, and the timer starts measuring time. Steps 110, 111 and 112 following the step 109 are substantially the same as the steps 103, 104 and 105. At a last step 113, the control section 67 checks the timer and determines whether the predetermined time interval has elapsed. On the expiration of the predetermined time interval, this charging system terminates this charging procedure by opening the contact S1.

Thus, the charging system according to this embodiment is arranged to detect a saturation of at least one constant voltage circuit 4 for equal charging, and notify the charger of the saturation to cause the charger to decrease the charging current. Therefore, it is possible to reduce the current capacity of the constant voltage circuits 4.

By addition of the constant voltage circuits 4, the quantity of electricity shown by hatching in FIG. 5 is bypassed, and for at least the total of 0.27 Ah, a balance can be obtained. This system can therefore charge the respective single cells equally within a shorter time, and reduce the current capacity of the constant voltage circuits 4.

Figure 7:
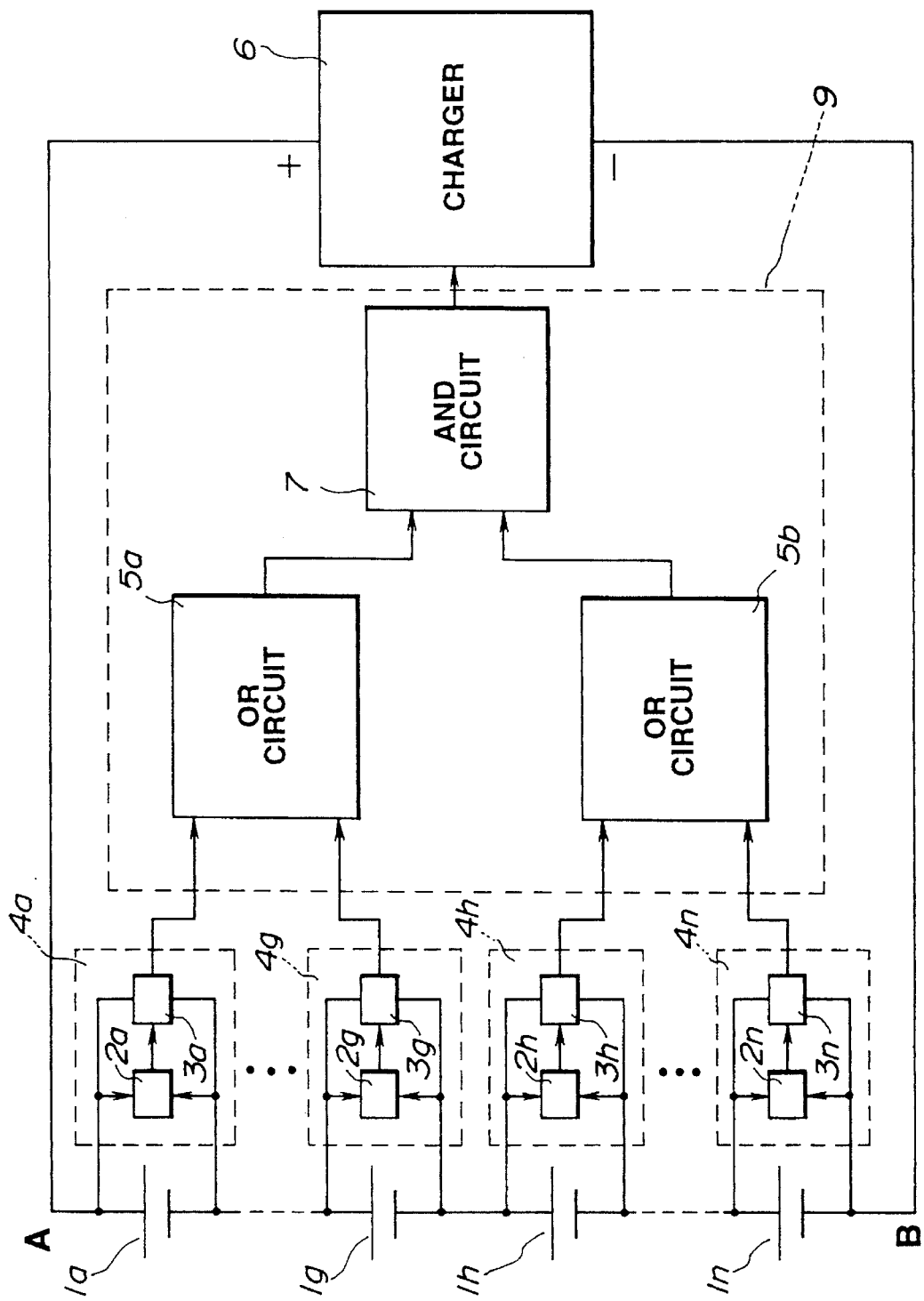
FIG. 7 is a block diagram showing a battery charging system according to a second embodiment of the present invention.

FIG. 7 shows a battery charging system according to a second embodiment of the present invention. In the second embodiment, the OR circuit 5 is replaced by a logic circuit 9. As to the other aspects, the second embodiment is the same as the first embodiment. The logic circuit 9 shown in FIG. 7 comprises first and second OR circuits 5a and 5b and an AND circuit 7.

In the example shown in FIG. 7, the single cells 1a, 1b, ..., 1n of the battery assembly are divided into two equal blocks (or subsets). The first block consists of the cells 1a, ..., 1g, and the second block consists of the cells 1h, ..., 1n. The constant voltage circuits 4a, ..., 4g of the single cells belonging to the first block are connected to the first OR circuit 5a of the logic circuit 9. The constant voltage circuits 4h, ..., 4n for the second block are connected to the second OR circuit 5b. In this example, the total number of the single cells is 144, and each of the first and second blocks includes 72 single cells.

The outputs of the first and second OR circuits 5a and 5b are connected to the AND circuit 7, whose output is connected to the charger 6. When at least one of the constant voltage circuits 4 in both blocks produces the saturation signal, then the AND circuit 6 outputs the saturation signal and causes the charging current to be decreased.

Thus, the charging system of the second embodiment is arranged to decrease the charging current when two or more of the constant voltage circuits 4 produce the saturation signals. Therefore, this system can not only offer the same effect as in the first embodiment, but this system can also prevent prolongation of the charging time by preventing the charging current for the whole of the battery assembly from being decreased even if one of the single cells lose a charging balance.

The battery charging system of the present invention can be made up of the following means, according to one construction. A charging means is a means for supplying a charging current to a series connection of cells (or unit batteries) constituting a battery (or a set battery or a battery assembly). In the illustrated examples, the items 61–66, and S1–S4 shown in FIG. 2 be construed as being at least part of the charging means. Each of a plurality of regulator circuits (such as the constant voltage circuits 4) is connected in parallel with a unique one of said cells, and comprises a regulating means for regulating a terminal voltage (or cell voltage) of the corresponding one of said cells by controlling a bypass current bypassing the corresponding one of said cells, and a commanding means for producing a command signal in accordance with the terminal voltage of the corresponding one of said cells. The regulating means can be regarded as corresponding to the items 43, 45, 47, 52 and 53, for example, and the commanding means can be regarded as corresponding to the items 44, 49, 50 and 55, for example. A control means is a means for causing said charging means to reduce said charging current in response to said command signal. For example, the items 5, 5a, 5b, 7, 9 and 67 can serve as the control means.

Preferably, the regulating means (43, 45, 47, 52 and 53 in the above-mentioned example of the interpretation) of each of said regulator circuits (4) comprises a voltage detecting means (43, 45, 46, 47) for detecting the terminal voltage, and a bypass current controlling means (53) for maintaining the terminal voltage substantially constant by increasing a fraction of the charging current bypassing the associated cell, in accordance with the detected terminal voltage; and the commanding means (44, 49, 50, 55) comprises a means for detecting a saturation of the bypass current by monitoring an increase of the terminal voltage, and for producing said command signal when the saturation of the bypass current is detected. The reference numerals in parentheses in this paragraph and the following explanation merely denote the items which can be regarded as a corresponding item according to one example of interpretation, and they are not meant to exclude other possible interpretations.

The control means (5, 5a, 5b, 7, 9, 67) may comprise a logic circuit (5, 5a, 5b, 7, 9) comprising a plurality of input terminals each of which is connected with a unique one of said regulator circuits (4), and a single output terminal for delivering an output signal for commanding a decrease of said charging current when the command signal (such as a saturation indicative signal) is inputted to at least one of said input terminals.

Each of the regulator circuits 4 in the illustrated example comprises a bypass circuit section (52, 53) for forming a current path bypassing the corresponding one of said cells; said voltage detecting means (43, 45, 46, 47) of the illustrated example comprises a first comparing means (43, 47) for comparing the terminal voltage (or cell voltage) with a predetermined first voltage level, and turning said bypass current controlling means (53) from an off state for opening said bypass circuit section to an on state for closing said bypass circuit section when the terminal voltage is equal to or higher than a predetermined first voltage value; and said commanding means (44, 49, 50, 55) may be arranged to detect the saturation of the bypass current by monitoring an increase of the terminal voltage from said first voltage level and producing said command signal when the saturation of the bypass current is detected.

The commanding means (44, 49, 50, 55) in the illustrated example comprises a second comparing means (50) for directly or indirectly producing said command signal when the terminal voltage becomes equal to or higher than a second predetermined voltage value which is higher than said first voltage value, and said control means (5, 5a, 5b, 7, 9, 67) may be arranged to reduce said charging current in response to said command signal sent from at least one of said regulator circuit (4).

The bypass circuit section of each of said regulator circuits (4) in the illustrated example comprises a bypass resistor (52) and said bypass current controlling means (53). The bypass resistor (52) has a first resistor end connected with a first terminal of the corresponding one of said cells (1) and a second resistor end. The bypass current controlling means including a regulating transistor (53) comprising a first electrode (such as a collector) connected with the second resistor end of said bypass resistor, a second electrode (such as an emitter) connected with a second terminal of the corresponding one of said cells (1), and a control electrode (such as a base) connected with the output terminal of said first comparing means (47). The control means (5, 5a, 5b, 7, 9, 67) in the illustrated examples comprises said logic circuit (5, 5a, 5b, 7, 9) for producing the output signal when said logic circuit receives said command signal from at least one of said regulator circuits (4), and a control section (67) for determining a count by counting a number of said output signals inputted to said control section from said logic circuit, and reducing said charging current as said count increases.

The charging means (61–66, S1–S4) of the illustrated example comprises a current decreasing means for decreasing said charging current by such an amount that a decrease of said charging current causes said regulating transistor (53) to turn from the on state to the off state by causing the terminal voltage to decrease below said first voltage level in response to a control signal supplied from said control section. The control signal may be a switch control signal for controlling switches such as the items S2, S3 and S4.

The current decreasing means comprises a constant current generating means (61–66) for maintaining said charging current at one of first, second and third current levels, and for decreasing said charging current from said first current level (25 A, for example) to said second level (15 A, for example) which is lower than said first level when said count becomes equal to one, and further decreasing said charging current from said second level to said third level (5 A, for example) which is lower than said second level when said count becomes equal to two.

Each of said regulator circuits (4) in the illustrated example comprises a reference voltage generating means (41, 42) which is connected in parallel to the corresponding one of said cells (1), and which generates a reference voltage (or preset voltage), and supplies said reference voltage to said first and second comparing means (47, 50). The first comparing means comprises a first voltage divider (43) for producing a first fractional voltage by dividing the terminal voltage and a first comparator (47) for comparing said first fractional voltage with said reference voltage and for producing a difference signal which represents a difference between the terminal voltage and the first voltage level and which is supplied to said control electrode (such as the base) of said regulating transistor (53). The second comparing means comprises a second voltage divider (44) for generating a second fractional voltage which is lower than said first fractional voltage by dividing the terminal voltage, and a second comparator (50) for comparing said second fractional voltage with said reference voltage. The control section (67) of the illustrated example is arranged to terminate the supply of said charging current to said battery by opening the switch S1 at the end of a predetermined time interval starting from an instant when the charging current is reduced to a predetermined lowest level (5 A, for example) greater than zero, or when the switch S4 is closed. The control section (67) may comprise an interval timer means for start measuring time when the charging current is reduced to the lowest level (5 A, for example), and for opening the circuit for supplying the charging current to the battery with the switch S1 at the end of the predetermined time interval. For example, the timer means may be arranged to start measuring time when the contact S4 is closed to reduce the charging current to the lowest level.

The reference voltage generating means of each of said regulator circuits (4) in the illustrated example comprises a Zener diode (42), and said second comparing means further comprises a photocoupler (or optoisolator) (55) for producing said command signal in response to an output signal of said second comparator (50), and said regulating transistor (53) in the illustrated example is in the form of an NPN bipolar transistor.

An increase in the terminal voltage of the single cell 1 increases the base-emitter voltage of the transistor 53, which in turn increases the current through the resistor 52.

In the example shown in FIG. 3, the Zener diode 42 and the resistor 41 are connected in series, and this series combination is connected in parallel with the corresponding cell 1. An intermediate point (or tap) between the resistor 41 and the Zener diode 42 is connected, respectively, to the inverting inputs of the comparators 47 and 50 through the resistors 46 and 48. In the example shown in FIG. 3, the variable resistors 43 and 44 are voltage dividers whose intermediate taps are connected to the noninverting inputs of the amplifier 47 and 50 through the resistors 45 and 49, respectively. Each of the variable resistors 41 and 44 is connected in parallel to the single cell 1.

The logic circuit of the example shown in FIGS. 1–3 comprises an OR circuit (or OR gate) (5) comprising a single output terminal connected to said control section (67) and a plurality of input terminals each of which is connected with the output terminal of said photocoupler (55) of a unique one of said regulator circuits (4).

The logic circuit in the example shown in FIG. 7 comprises a plurality of OR circuits (5a, 5b) each of which comprises a plurality of input terminals and a single output terminal, and an AND circuit (7) comprising a plurality of input terminals each of which is connected with the output terminal of a unique one of said OR circuits, and a single output terminal connected to said control section (67). Each of said regulator circuits is connected to a unique one of said input terminals of said OR circuits (5a, 5b).

In the second embodiment, the set of the series connected cells (1) is divided into two or more subsets each of which contains at least two of the cells (1). In the example of FIG. 7, the cell set is equally divided into the subsets, and each subset is a series combination. That is, the cardinal numbers of the subsets are all equal, and the cells of each subset are connected consecutively in series.

The AND circuit (or gate) 7 of the example of FIG. 7 produces the saturation signal (or the command signal) to command a decrease of the charging current when at least one of the constant voltage circuits of the first block (or subset) produces the saturation signal and at least one of the constant voltage circuit of the second block (or subset) produces the saturation signal.

What is claimed is:

1. A battery charging system for charging a battery of cells connected in series with one another, said system comprising:

a charging means for charging said battery, and for controlling a charging current;

a voltage detecting means for detecting a terminal voltage of each of said cells;

a constant voltage means for controlling the terminal voltage of each cell by causing the charging current of each cell to bypass in accordance with the terminal voltage detected by said voltage detecting means;

a current saturation detecting means for detecting a saturation of a bypass current caused by said constant voltage means; and a controlling means for controlling said charging means so as to decrease the charging current in accordance with an output of said current saturation detecting means;

wherein said charging means includes a means for performing a constant current charging operation, and said controlling means includes a means for decreasing the charging current of the charging means stepwise in accordance with an output of said saturation detecting means; and wherein said controlling means includes a means for decreasing the charging current by a predetermined amount of decrease at each of stepwise decreases, and said amount of decrease is equal to or greater than a bypass current capacity of said constant voltage means, and equal to or smaller than double the bypass current capacity.

2. A battery charging system according to claim 1 wherein each of said constant voltage means is connected in parallel with, and supplied with power from, a corresponding one of said cells of said battery.

3. A battery charging system for a battery of cells connected in series with one another, said system comprising:

a charging means for charging said battery, and for controlling a charging current;

a voltage detecting means for detecting a terminal voltage of each of said cells;

a constant voltage means for controlling the terminal voltage of each cell by causing the charging current of each cell to bypass;

a current saturation detecting means for detecting a saturation of a bypass current caused by said constant voltage means;

a logic circuit for producing a saturation signal in response to at least one output signal of said current saturation detecting means; and a controlling means for controlling said charging means so as to decrease the charging current in accordance with said saturation signal outputted from said logic circuit;

wherein said cells are divided into a plurality of blocks, and said logic circuit comprises a circuit for producing said saturation signal when at least one of said current saturation detecting means produces the output signal in each block.

4. A battery charging system according to claim 3 wherein each of said constant voltage means is connected parallel with, and supplied with power from, a corresponding one of said cells of said battery.

5. A battery charging system according to claim 3 wherein said charging means includes a means for performing a constant current charging operation, and said controlling means includes a means for decreasing the charging current of the charging means stepwise in accordance with said saturation signal of said logic circuit.

6. A battery charging system according to claim 5 wherein said controlling means includes a means for decreasing the charging current by a predetermined amount of decrease at each of stepwise decreases, and said amount of decrease is equal to or greater than a bypass current capacity of said constant voltage means, and equal to or smaller than twice the bypass current capacity.

7. A battery charging system for charging a battery of series connected cells, said system comprising:

a charging means for supplying a charging current to a series connection of said cells to charge said battery;

a plurality of regulator circuits each of which is connected in parallel with a unique one of said cells and each of which comprises a regulating means for regulating a terminal voltage of the corresponding one of said cells by controlling a bypass current bypassing the corresponding one of said cells, and a commanding means for producing a command signal in accordance with the terminal voltage of the corresponding one of said cells; and a control means for causing said charging means to reduce said charging current in response to said command signal;

wherein said regulating means of each of said regulator circuits comprises a voltage detecting means for detecting the terminal voltage, said voltage detecting means comprises a first comparing means for comparing the terminal voltage with a predetermined first voltage level, and said regulating means of each of said regulator circuits further comprises a bypass current controlling means for maintaining the terminal voltage substantially constant by decreasing a current flowing through the corresponding one of said cell by increasing the bypass current in accordance with an output signal produced by said first comparing means; and wherein said commanding means comprises a saturation detecting means for detecting a saturation of the bypass current by monitoring an increase of the terminal voltage from said first voltage level and for producing said command signal when the saturation of the bypass current is detected, and said saturation detecting means comprises a second comparing means for producing said command signal when the terminal voltage becomes equal to or higher than a second predetermined voltage level which is higher than said first voltage level.

8. A battery charging system according to claim 7 wherein said control means comprises a logic circuit comprising a plurality of input terminals each of which is connected with a unique one of said regulator circuits, and a single output terminal for delivering an output signal for commanding a decrease of said charging current when said command signal is inputted to at least one of said input terminals.

9. A battery charging system according to claim 8 wherein each of said regulator circuits comprises a bypass circuit section for forming a current path bypassing the corresponding one of said cells; and said first comparing means includes a means for turning said bypass current controlling means from an off state for opening said bypass circuit section to an on state for closing said bypass circuit section when the terminal voltage is higher than said predetermined first voltage level.

10. A battery charging system for charging a battery of series connected cells, said system comprising:

a charging means for supplying a charging current to a series connection of said cells to charge said battery;

a plurality of regulator circuits each of which is connected in parallel with a unique one of said cells and each of which comprises a regulating means for regulating a terminal voltage of the corresponding one of said cells by controlling a bypass current bypassing the corresponding one of said cells, and a commanding means for producing a command signal in accordance with the terminal voltage of the corresponding one of said cells; and a control means for causing said charging means to reduce said charging current in response to said command signal;

wherein said regulating means of each of said regulator circuits comprises a voltage detecting means for detecting the terminal voltage, and a bypass current controlling means for maintaining the terminal voltage substantially constant by decreasing a current flowing through the corresponding one of said cells by increasing the bypass current in accordance with the detected terminal voltage; and wherein said commanding means includes a means for detecting a saturation of the bypass current by monitoring an increase of the terminal voltage, and for producing said command signal when the saturation of the bypass current is detected;

wherein said control means comprises a logic circuit comprising a plurality of input terminals each of which is connected with a unique one of said regulator circuits, and a single output terminal for delivering an output signal for commanding a decrease of said charging current when said command signal is inputted to at least one of said input terminals;

wherein each of said regulator circuits comprises a bypass circuit section for forming a current path bypassing the corresponding one of said cells; said voltage detecting means comprises a first comparing means for comparing the terminal voltage with a predetermined first voltage level, and turning said bypass current controlling means form an off state for opening said bypass circuit section to an on state for closing said bypass circuit section when the terminal voltage is higher than said predetermined first voltage level; and said commanding means includes a means for detecting the saturation of the bypass current by monitoring an increase of the terminal voltage from said first voltage level and producing said command signal when the saturation of the bypass current is detected; and wherein said commanding means comprises a second comparing means for producing said command signal when the terminal voltage becomes equal to or higher than a second predetermined voltage level which is higher than said first voltage level, and said control means includes a means for reducing said charging current in response to said command signal sent from at least one of said regulator circuits.

11. A battery charging system according to claim 10 wherein said bypass circuit section of each of said regulator circuits comprises a bypass resistor and said bypass current controlling means, said bypass resistor comprising a first resistor end connected with a first terminal of the corresponding one of said cells and a second resistor end, and said bypass current controlling means including a regulating transistor comprising a first electrode connected with said second resistor end of said bypass resistor, a second electrode connected with a second terminal of the corresponding one of said cells, and a control electrode connected with said first comparing means; and said control means comprises said logic circuit for producing the output signal when said logic circuit receives said command signal from at least one of said regulator circuits, and a control section for determining a count by counting a number of said output signals inputted to said control section from said logic circuit, and reducing said charging current as said count increases.

12. A battery charging system according to claim 11 wherein said charging means comprises a current decreasing means for decreasing said charging current by such an amount that a decrease of said charging current causes said regulating transistor to turn from the on state to the off state by causing the terminal voltage to decrease below said first voltage level in response to a control signal supplied from said control section.

13. A battery charging system according to claim 12 wherein said current decreasing means comprises a constant current generating means for maintaining said charging current at one of first, second and third current levels, and for decreasing said charging current from said first current level to said second level which is lower than said first level when said count becomes equal to one, and further decreasing said charging current from said second level to said third level which is lower than said second level when said count becomes equal to two.

14. A battery charging system according to claim 13 wherein each of said regulator circuits comprises a reference voltage generating means which is connected in parallel to the corresponding one of said cells and which generates a reference voltage, and supplies said reference voltage to said first and second comparing means; wherein said first comparing means comprises a first voltage divider for producing a first fractional voltage by dividing the terminal voltage and a first comparator for comparing said first fractional voltage with said reference voltage and for producing a difference signal which represents a difference between the terminal voltage and the first voltage level and which is supplied to said control electrode of said regulating transistor; wherein said second comparing means comprises a second voltage divider for generating a second fractional voltage which is lower than said first fractional voltage by dividing the terminal voltage, and a second comparator for comparing said second fractional voltage with said reference voltage; and wherein said control section includes a means for terminating the supply of said charging current to said battery at an end of a predetermined time interval starting from an instant when the charging current is reduced to a predetermined lowest level greater than zero.

15. A battery charging system according to claim 14 wherein said reference voltage generating means of each of said regulator circuits comprises a Zener diode, and said second comparing means further comprises a photocoupler for producing said command signal in response to an output signal of said second comparator, and said regulating transistor is a bipolar transistor.

16. A battery charging system according to claim 11 wherein said logic circuit comprises an OR circuit comprising an output terminal connected to said control section and a plurality of input terminals each of which is connected with a unique one of said regulator circuits.

17. A battery charging system according to claim 11 wherein said logic circuit comprises a plurality of OR circuits each of which comprises a plurality of input terminals and a single output terminal, and an AND circuit comprising a plurality of input terminals each of which is connected with the output terminal of a unique one of said OR circuits, and an output terminal connected to said control section, each of said regulator circuits being connected to a unique one of said input terminals of said OR circuits.

18. A battery charging system according to claim 7 wherein each of said regulator circuits comprises a reference voltage generating means for generating a reference voltage and supplying said reference voltage to said first comparing means; said reference voltage generating means and said bypass current controlling means are both connected in parallel with a corresponding one of said cells; and said reference voltage generating means is connected with said second comparing means to supply said reference voltage to said second comparing means.

19. A battery charging system according to claim 18 wherein said first comparing means comprises a first voltage divider for producing said first voltage which is a first fractional voltage of the terminal voltage obtained by dividing the terminal voltage and a first comparator for comparing said first voltage with said reference voltage and for producing a difference signal which represents a difference between the terminal voltage and the first voltage level and which is supplied to said bypass current controlling means; and wherein said second comparing means comprises a second voltage divider for generating a second fractional voltage which is lower than said first fractional voltage by dividing the terminal voltage, and a second comparator for comparing said second fractional voltage with said reference voltage.

* * * * *